July 24, 1951  D. H. PEGRUM  2,561,883
METHOD OF AND APPARATUS FOR PRODUCING SOUND
WAVES FROM VIBRATING STRINGS
Filed Aug. 1, 1947  3 Sheets-Sheet 1
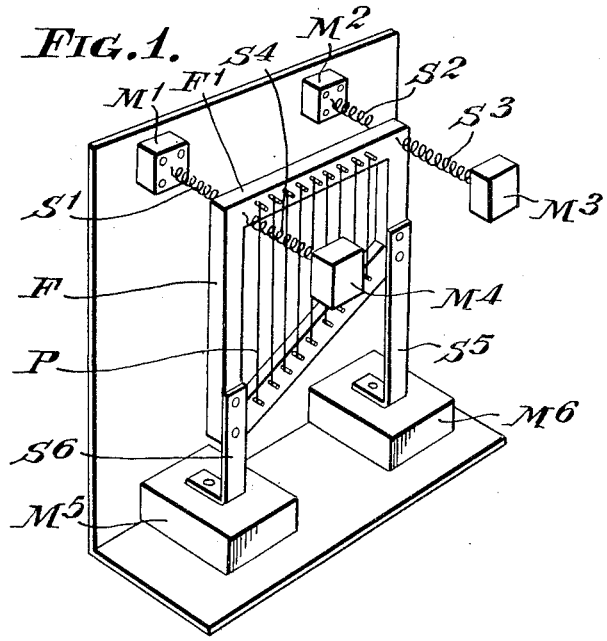
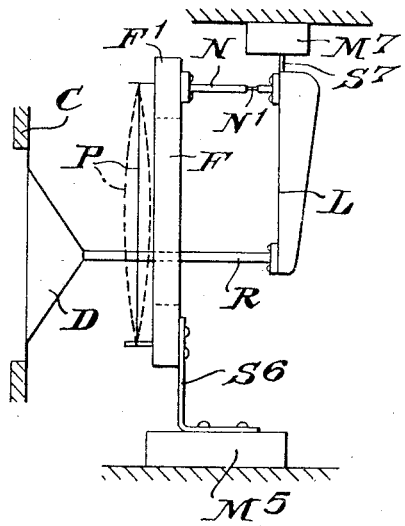
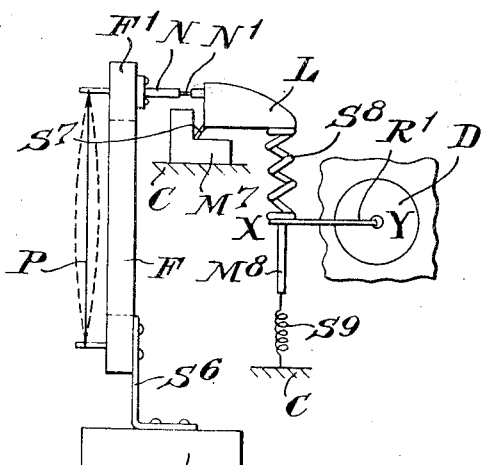
INVENTOR,
DONALD H. PEGRUM.

July 24, 1951  D. H. PEGRUM  2,561,883
METHOD OF AND APPARATUS FOR PRODUCING SOUND
WAVES FROM VIBRATING STRINGS
Filed Aug. 1, 1947  3 Sheets-Sheet 2
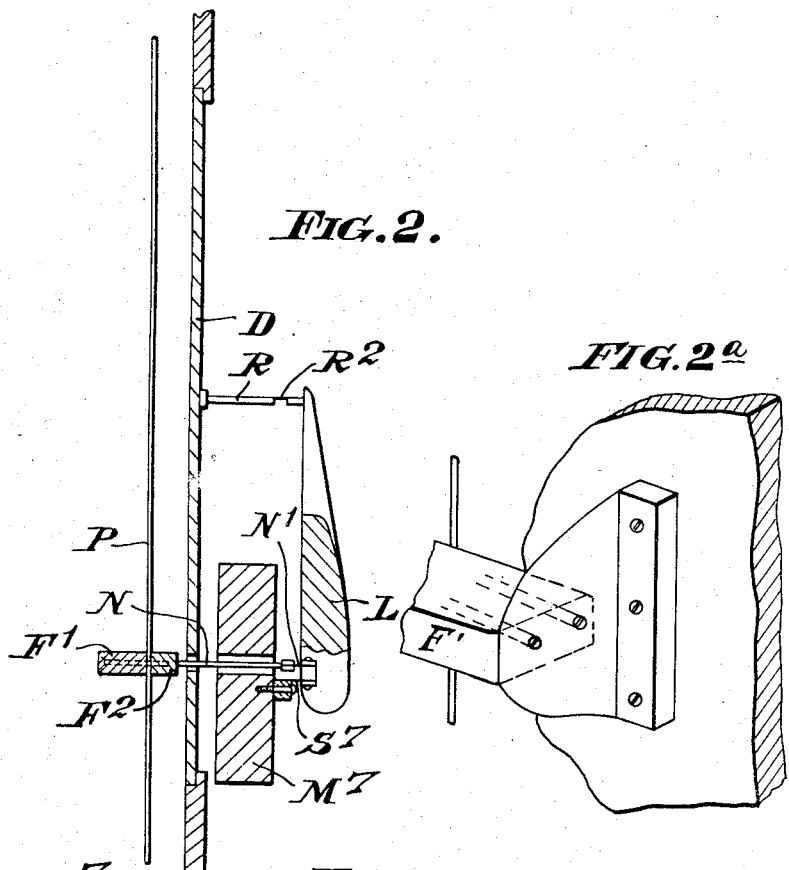
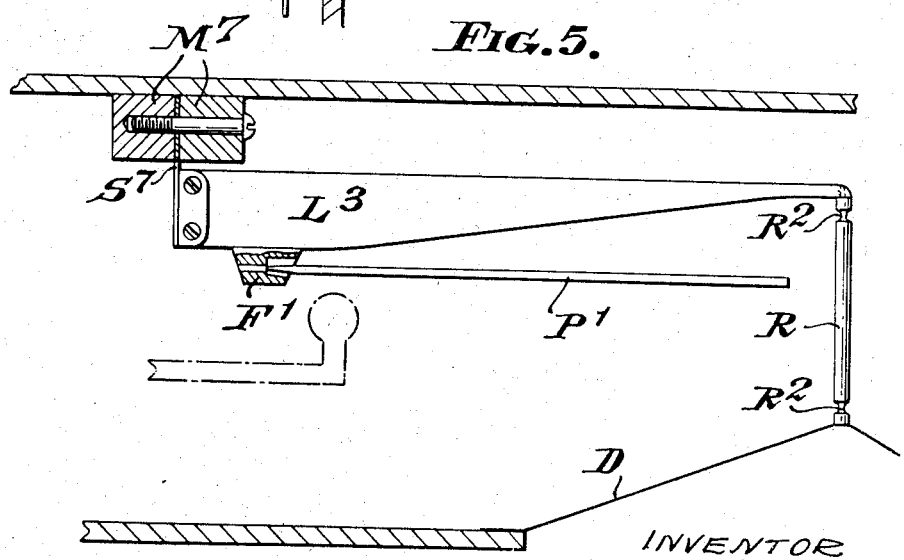
INVENTOR
DONALD H. PEGRUM July 24, 1951

D. H. PEGRUM 2,561,883

METHOD OF AND APPARATUS FOR PRODUCING SOUND
WAVES FROM VIBRATING STRINGS

Filed Aug. 1, 1947

INVENTOR,
DONALD H. PEGRUM.
By [signature] Atty.

Patented July 24, 1951

2,561,883

UNITED STATES PATENT OFFICE 2,561,883

METHOD OF AND APPARATUS FOR PRODUCING SOUND WAVES FROM VIBRATING STRINGS

Donald Henry Pegrum, Enfield, England

Application August 1, 1947, Serial No. 765,424
In Great Britain August 29, 1945

Section 1, Public Law 690, August 8, 1946
Patent expires August 29, 1965

6 Claims. (Cl. 84—189)

This invention relates to a method of and apparatus for producing sound waves from vibrating bodies, such as the strings or wires of a pianoforte, vibrating rods or the like.

One object of the invention is to provide an improved method of converting the forces derived from the vibrating member or members into sound waves by employing a suitable sound radiator which results in an increase in volume as compared with present methods.

A further object is to provide an apparatus wherein the tone or quality of the sound can be varied and one wherein the balance or relative intensities of notes of different frequencies can be varied.

A still further object is to provide an improved arrangement which will prevent a sudden break or change in quality of tone when sounding a succession of strings, some of which are connected to my novel system, and others of which are mounted upon the main pianoforte soundboard by means of a bridge directly attached to the soundboard.

These and other related objects are achieved by coupling the vibrating body (or bodies) to a second body which forms a support for, or is attached to, the vibrating body (or bodies), magnifying the vibrations of the second body by mechanical means, and communicating the magnified vibrations to a third body of smaller mass than the second, said third body being an efficient sound radiator, and the whole arrangement being adapted to operate in such a manner that mechanical friction is reduced to a minimum, and that the optimum degree of matching for the desired result, of the impedance of the sound radiator to the source of energy, is secured.

The invention will now be described by way of example with reference to the accompanying drawings.

On the drawings:

Figure 1 illustrates the application of the invention to a pianoforte, and shows in perspective one method of resiliently mounting the frame, Figure 2 illustrates in side elevation the preferred arrangement of the lever linkage system coupling the various portions of the apparatus.

Fig. 2a is a detail view of the connection between the bridge and frame.

Figures 3 and 4 illustrate modifications of the arrangement shown in Figure 2,

Figure 5 illustrates the application of the invention to a vibrating rod,

Figure 6:
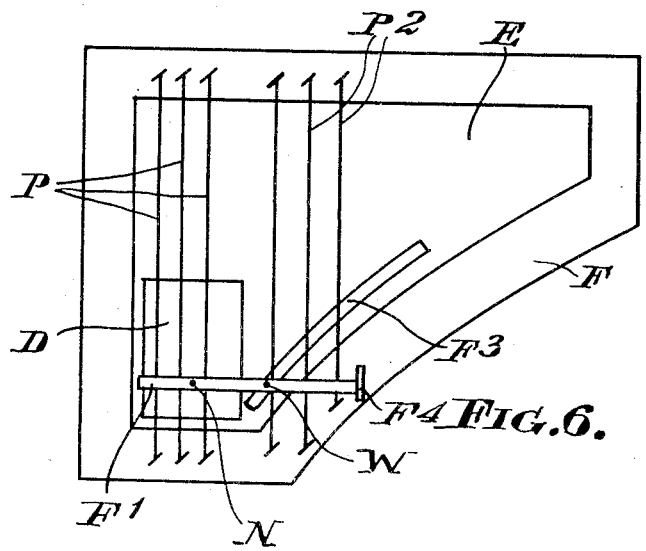
Figure 6 illustrates the coupling arrangement between the diaphragm bridge member and soundboard for preventing a sudden change in tone quality when sounding a succession of strings.

Referring to Figure 1, the frame F carrying the piano strings P is resiliently held by springs designated S1 to S6. The springs are connected to blocks or masses of material designated M1 to M6 which are connected to the pianoforte casing. The resilience of the frame mounting is such as to allow for its oscillation at a low natural frequency, say of the order of 10 cycles per second.

The frame F is coupled by means of a linkage and magnifying lever system to a diaphragm or other sound radiator.

Figure 2 illustrates the preferred arrangement of the lever linkage magnifying system. In this Figure 2 the vibrating body (or bodies) that is, the string P, is coupled to a bridge member F1 which is clamped to a backing piece F2 so that the string (or strings) P is gripped therebetween. The bridge member F1 thus forms a lever support for the strings and it is pivotally connected at one end to the pianoforte case or frame (Fig. 2a). The bridge F1 and backing piece F2 are connected to the rod N which is coupled to the lever L by means of the flexible spring strip N1. The lever L is pivotally mounted on the heavy supporting body or mass M7 by means of the spring strip S7 and is connected at its other end by means of the further rod R to the sound radiator D, the rod R incorporating a flexible connecting piece R2.

The sound radiator D is shown as a flat diaphragm of light weight and mass mounted in a space provided by removal of a portion of the soundboard of the pianoforte. This construction has the advantage that it is not always necessary to mount the frame resiliently, as shown in Figure 1, when it is of large dimensions.

The arrangement just described with reference to Figure 2 may be employed over a portion only of the pianoforte frame, if desired.

Figure 3 illustrates a modified arrangement of the lever linkage system particularly suited for the transmission of the higher audio frequencies, say those of the order of 2 to 10 kilocycles per second.

In Figure 3 the frame F is mounted in the same manner as in Figure 1 but the upper horizontal member F1 of the frame F is coupled by the rearwardly extending rod N to a quadrant shaped lever L1 mounted by means of the short flat spring S7 on to the mass M7 which is fixed to the case C. The rod N is provided with a flexible neck N1 at its outer end, as in Fig. 2, and the arrangement is such that the vibrations are transmitted horizontally by the rod N to the vertical face of the right angled quadrant member L1. A vertical depending spring S8 is connected to the horizontal face of the quadrant L1 so that the direction of vibration is altered through a right angle and amplified.

The spring S8 consists of a flat strip of metal coiled to a suitable pitch (45°) so that when coiled the flat surface of the strip is parallel with the axis of the spring and the said spring S8 is characterised in that when compressed, a considerable degree of axial rotation occurs at the free end shown at X in Fig. 3.

Secured to the free end X of the spring S8 is the upper end of a rod M8. The lower end of the rod M8 is connected to the upper end of a coiled spring S9 which is connected at its lower end to the case C. The compliance of the spring S9 is much greater than that of the upper spring S8.

A thin flexible strip R1 extends radially from the lower end X of the spring S8 and is attached at the point Y to the diaphragm D in such a manner that the flat surface of the said member R1 is in a plane at a right angle to the axis of the spring S8 and the useful direction of motion of the diaphragm D is in a plane parallel with the flat surface of the strip R1 and at a right angle to the major axis of the strip.

The arrangement described with reference to Fig. 2 is preferably employed in combination with that just described with reference to Fig. 3 although any desired combination may be used. Either of the arrangements described may be employed over a part only of the full range of the instrument.

Figure 4 illustrates a further embodiment of the lever linkage coupling system. A rod N is secured to the upper horizontal member F1 of the frame F and extends rearwardly therefrom. The rod N is rigid except for a flexible or springy neck N1 adjacent to its rear end.

A further mass or body M7 is secured to the casing C and is of the order of ten times the weight of the frame F. A light rigid lever L depends from the mass M7 and is connected thereto by means of a short flat spring S7. The rear end of the rod N is connected to the lever L at a point just below its upper end whilst the lower end of the lever L is connected by means of a further rod R to a member of light mass D shown in this figure as a conical diaphragm of light weight mounted in the front of the casing C.

Vibrations from a string or strings P, shown in full and dotted lines, are transmitted by the upper rod N to the lever L and are thereby magnified in amplitude and communicated to the diaphragm D or its equivalent.

The arrangement just described with reference to Figure 4 is particularly intended for lower and middle frequency response, say approximately 50 to 1000 cycles per second, and may be employed over a portion only of a pianoforte frame.

Figure 5 illustrates an embodiment of the invention as applied to a vibrating rod. One end of the rod P1 is tapered or necked and is held in a clamp or bridge F1 which is mounted on a lever L3 near its end. The lever L3 is pivotally attached by means of a short spring strip S7 to a support of heavy mass M7.

The free end of the lever L3 carries a rod R which connects it to the sound radiator D, shown as a conical diaphragm of light weight and mass. The rod R is provided with a flexible neck R2 at each end.

A plurality of levers L may be provided and these may be interposed between the vibrating member, such as the frame F or rod P1, and the diaphragm D, in series or cascade fashion. Thus, the frame is connected by means of a necked rod to a median point of a lever, which is coupled by means of a short flexible strip to a heavy mass. The free end of this lever is connected by a second necked rod to a median position on a second lever which is similarly connected to the mass by means of a flexible strip, and a further necked rod and lever may also be provided, the free end of the last lever being coupled to the diaphragm.

Figure 6 illustrates the application of the invention to a pianoforte adapted to prevent a sudden break or change in quality of tone when sounding a succession of strings, some of which (P) are connected to the lever system just described and others of which (P2) are mounted upon the main pianoforte soundboard by means of a bridge directly attached to the soundboard.

In Fig. 6 the piano frame F is made of iron and carries the soundboard E. Some of the strings P are connected through the arrangement described in any of the preceding embodiments by means of a bridge member F1 to a diaphragm D. The bridge member F1 may be pivoted at its end F4 to the frame F or alternatively it may be pivoted to said frame adjacent to its end F4. The rod N connecting the bridge member F1 to the magnifying lever system extends to the rear through a hole in the diaphragm D. The remaining strings P2 are arranged in the more normal manner and are connected by means of a bridge member F3 to the soundboard E. The diaphragm D is joined firmly at its edges to the soundboard E but may, if desired, be mounted with an air gap between its edges or the edges of its mounting and the edge of the soundboard E.

The strings P act chiefly through the magnifying lever system upon the diaphragm D but also to a lesser extent upon the soundboard E. This latter effect takes place through a connection W which constitutes the essential feature of this particular embodiment of the invention. Depending chiefly upon the frequency and physical characteristics of the various component members, vibrations travelling from the point of attachment of the magnifying lever system to the diaphragm across its face, may, in the absence of the coupling W, set up out-of-phase or anti-phase vibrations in the soundboard. The coupling W however, provides the soundboard with impulses which, emanating from the very rigid diaphragm bridge member F1 are necessarily in phase with the impulses received by the diaphragm D, thus cancelling the unwanted out-of-phase vibrations. The converse is also true, that is to say, vibrations originating in the soundboard E are likewise prevented from setting up anti-phase vibrations in the diaphragm.

Figure 7A:
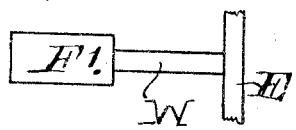
Figures 7A, 7B, 7C 8 and 9 illustrate specific embodiments of this coupling or connection.
Figure 7B:
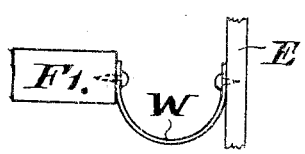
Figure 7C:
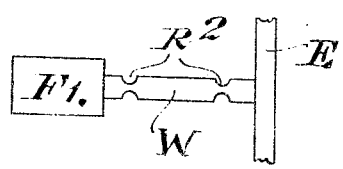

The coupling W may consist of a lever arrangement as described with reference to any of Figs. 2 to 5, alternative types of connection are shown in Figs. 7A, 7B and 7C and a further modified arrangement in Fig. 8 and also Fig. 9.

In Figure 7A the connection W is rigid and consists of a connecting piece coupling the bridge member F1 to the soundboard E, in Figure 7B the connection consists of a compliance constituted by a U-shaped spring strip and in Figure 7C the coupling W consists of a rod which is rigid axially but has flexible neck sections R2 adjacent to either one or both ends.

Figure 8:
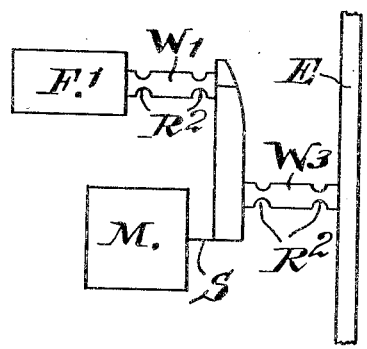

Figure 8 illustrates an embodiment of the connection W so arranged as to provide a step-down arrangement. The diaphragm bridge member F1 is connected by a flexibly necked rod W1 to one end of a step-down lever W2, the other end of which is pivoted at S to a heavy mass M on one side and on the opposite side by a similar type of flexibly necked rod W2 to the soundboard E.

Figure 9:
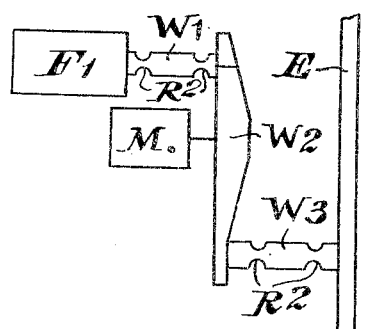

Figure 9 shows the lever W2 pivoted at approximately its centre point to the mass M by means of the spring S, this arrangement of the coupling provides a phase-reversing mechanism.

I claim:

1. In a pianoforte the combination, comprising, a plurality of strings, a lever contacting some of the strings at varying distances from its pivot, means maintaining contact between the lever and strings, stationary means pivotally carrying the lever, means mechanically amplifying the vibrations of the lever and means adjacent the soundboard converting the amplified vibrations into sound waves.

2. In a pianoforte the combination, comprising, a plurality of strings, a lever in contact with some of the strings at varying distances from its pivot, means maintaining contact between the strings and the lever, stationary means pivotally carrying the lever, means mechanically amplifying and transmitting the vibrations of the lever, a pianoforte soundboard and a diaphragm mounted adjacent the soundboard receiving the transmitted vibrations.

3. In a pianoforte having a plurality of strings and a soundboard, the combination, comprising, a lever in contact with some of the strings, at varying distances from its pivot, a member secured to the lever and pressing the strings in contact therewith, stationary means pivotally carrying the lever, means mechanically amplifying the vibrations of the lever, and converting the amplified vibrations into sound waves.

4. In a pianoforte the combination, comprising, a plurality of strings, a lever in contact with some of the strings at varying distances from its pivot, means maintaining contact between the strings and the lever, stationary means pivotally carrying the lever, a second lever, means coupling the levers, second stationary means pivotally carrying the second lever, a pianoforte soundboard, a diaphragm mounted adjacent the soundboard and means coupling the second lever to the diaphragm.

5. The combination according to claim 4 and wherein the means coupling the two levers and the means coupling the second lever to the diaphragm each includes a flexible piece.

6. In a pianoforte, the combination, comprising, a plurality of strings, a lever in contact with some of the strings at varying distances from its pivot, means maintaining contact between the strings and the lever and in detached relation to any other pianoforte part, stationary means pivotally carrying the lever, means mechanically amplifying the vibrations of the lever, and means adjacent the soundboard converting the amplified vibrations into sound waves.

DONALD HENRY PEGRUM.

REFERENCES CITED

The following references are of record in the file of this patent:

UNITED STATES PATENTS

| Number | Name | Date |
|---|---|---|
| 1,826,778 | Hammond | Oct. 13, 1931 |
| 2,206,650 | Sperry | July 2, 1940 |